Aug. 14, 1923.

E. H. ACKERMAN

WHEEL AND TIRE CONSTRUCTION

Filed Jan. 17, 1923

1,465,201

WITNESSES

INVENTOR
Edward H. Ackerman
BY
ATTORNEYS

Patented Aug. 14, 1923.

1,465,201

UNITED STATES PATENT OFFICE.

EDWARD H. ACKERMAN, OF MONTCLAIR, NEW JERSEY.

WHEEL AND TIRE CONSTRUCTION.

Application filed January 17, 1923. Serial No. 613,083.

*To all whom it may concern:*

Be it known that I, EDWARD H. ACKERMAN, a citizen of the United States, and a resident of Montclair, in the county of Essex and State of New Jersey, have invented a new and Improved Wheel and Tire Construction, of which the following is a full, clear, and exact description.

This invention relates to resilient tires, adapted particularly for use on the wheels of self-propelled vehicles.

The invention is of the general class of those previously proposed for use in connection with an outer tire, preferably a tire of the standard type commonly called a tire shoe, and comprising a substitute for the usual inner tube consisting of a plurality of expansible tube sections.

Previous attempts along this line, however, have provided the sections with individual air containers so designed and in such association that the rim or felly of the wheel or the entire shoe must be removed when a particular container is injured; or else elaborate conduit structures must be present so as to permit the use of a single inflation valve common to all the containers, in which case, of course, special separable connections must be incorporated between the different containers and said conduit structure; or else the injury and consequent deflation of a particular container has failed to permit the remaining uninjured containers to become redisposed in the tire shoe to give a substantially uniform and edequate distension of the tire shoe all around the same.

The present invention provides as a feature thereof a type of container which carries its own individual inflation valve and which is adapted to be arranged with a plurality of its fellows to completely fill the shoe and be nested therein in direct end to end contact all around the shoe; one of the important features of this type of container being the entire elimination of any transverse partitions, of flexible material or otherwise, arranged inside the shoe for separating the different containers, as well as the elimination of any inelastic hoods or similar adjuncts for the containers to limit the amount of abnormal distension to which any one or several of them may be subjected on injuring and deflating one or more of the other containers.

Pursuant to the foregoing, the present invention has two main objects:

The first of these main objects is to provide a general wheel and tire construction, in which containers of the above general type form elements cooperating with and located opposite to removable felly sections, these felly sections being arranged in alternation all around the wheel with somewhat similar sections permanently connected to the wheel hub; these parts in turn being in cooperative relation with a rim structure of a particular design, and such rim structure, while adapted to permanently engage a standard tire shoe, being bolted to certain felly sections in such a way that when the bolt or bolts particular to a certain removable felly section are removed, that felly section, the individual inflation valve carried thereby, and the container served by that valve, may all be instantly removed without disturbing any of the other parts, and so without removing the rim structure or the tire shoe from the wheel.

The second of said main objects is to provide a novel and improved type of container, and one characterized by features of construction based on certain discoveries and actual tests which have been made. I have discovered that in a tire of the class to which this invention appertains, it is absolutely necessary to provide containers such that when inflated they may have what may be termed a rolling action in practically all directions and that to this end they must be so constructed as to provide an interior including an annular chamber. The tests which I have made prove that excellent and practical results may be obtained when such containers are slightly elongated but of such length that each serves substantially one-twelfth of the interior of the tire shoe. As to this last defined relation, the same is, of course, not absolute, and represents only present preference in the light of the tests aforesaid.

The foregoing and other objects, and the invention itself, will be clearly understood from the following description, when taken in connection with the acompanying drawing, showing, as an example of the invention, a practical embodiment thereof as now preferred.

In this drawing.

Similar reference characters refer to similar parts throughout the several views of the drawing.

Figure 1:
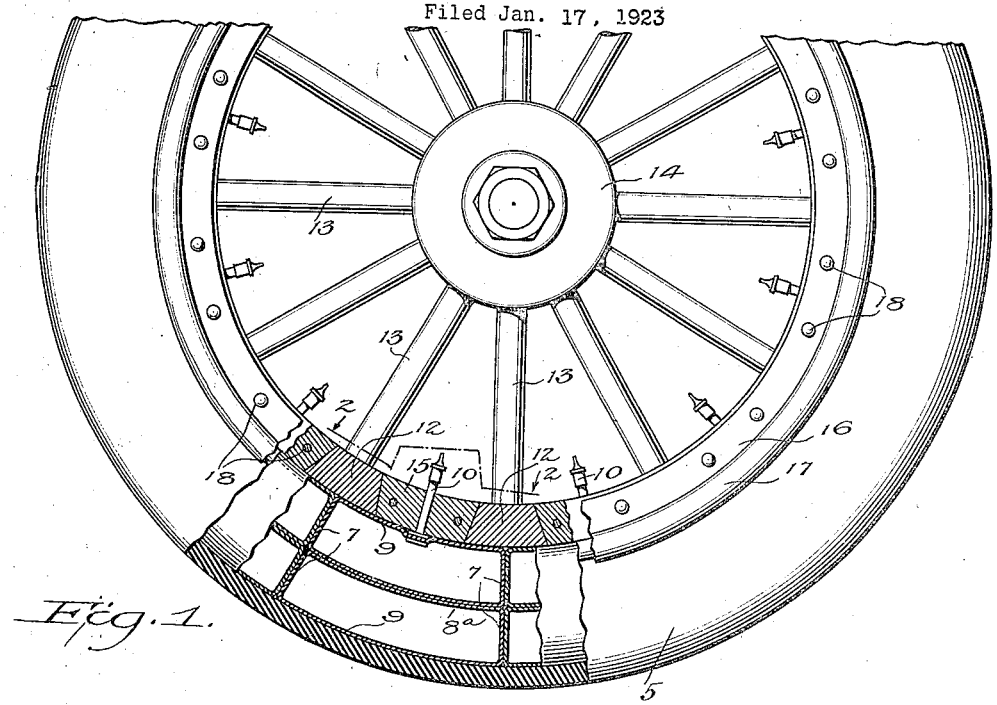
Fig. 1 is a side elevation of a portion of the wheel and tire construction, partly broken away and partly in section.

Referring to the details of the drawing, there will first be described one of the new containers adapted to be housed in a tire shoe 5 and adapted when inflated to be arranged in end to end direct contact therein in accordance with the invention. Such container is shown in deflated condition at 6 in Fig. 4, and it will be seen that container 6 includes opposite end walls 7, an inner tubular wall 8 and an outer tubular wall 9. The individual inflation valve for such container is indicated at 10 and projects from the outer tubular wall 9 intermediate the end walls 7 and preferably substantially midway of the length of the container.

Figures 2, 3, 4:
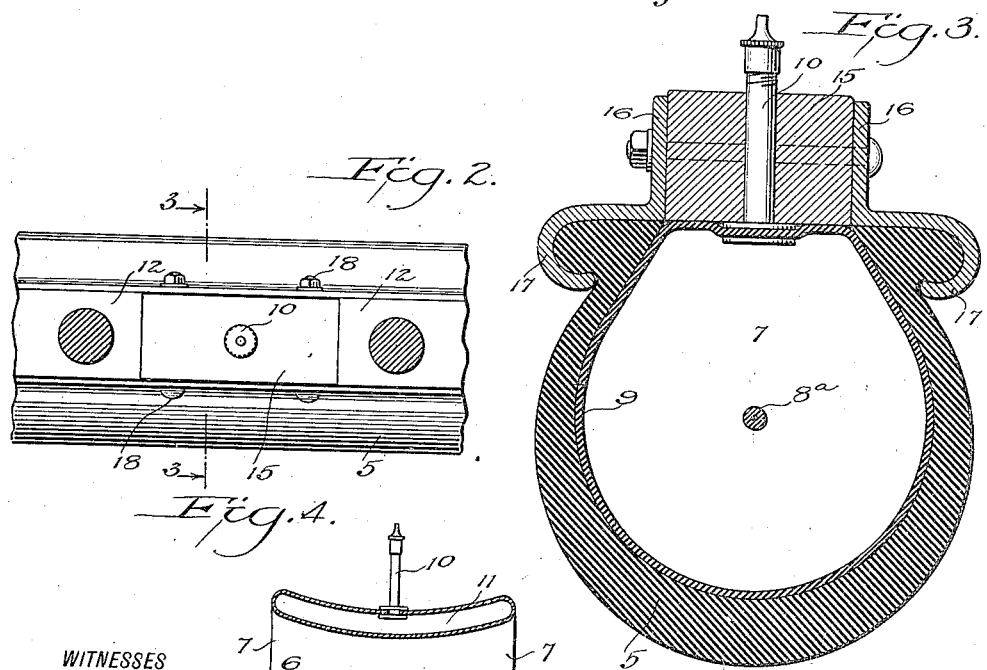
Fig. 2 is a fragmentary view, taken substantially on the line 2—2 of Fig. 1 and showing certain of the parts on an enlarged scale.
Fig. 3 is a very much enlarged view, being a transverse section taken on line 3—3 of Fig. 2.
Fig. 4 shows, on the same scale as Fig. 1, one of the containers in longitudinal section.

It will be understood that upon inflating the interior 11 of the container, of annular cross-section from end to end of the container as shown, the outer sleeve wall 9 of the container will become disposed as shown in Figs. 1 and 3, while the inner sleeve wall 8 of the container will become metamorphosed into a compact rope-like structure indicated at 8ª in Figs. 1 and 3; except, of course, that the terminal parts of the two sleeve walls 8 and 9 will flow and stretch to form end walls 7 having the shapes indicated in Figs. 1 and 3.

When a tire shoe of the kind indicated at 5 is equipped, by means of the special felly and rim structure to be described in a moment, with a series of such containers, so spaced that when all are inflated they directly contact each other as indicated in Fig. 1, I have found that the tube which each container in effect finally shapes rolls or slides from one side to the other, or from end to end and relatively to the location of the valve 10 in such a way that for the first time there is apparently provided, and by my new container, an inner tube means where the air under pressure in the tire shoe is not in one single compartment, and yet the air in any particular container may be completely lost without causing an entire or localized deflated condition of the shoe. When any container is punctured and deflated, the containers in its vicinity press against one another and roll until the gap formerly occupied by the deflated container when inflated is closed. The action of this new container cannot be sufficiently dilated on to give a true idea of its unexpectedly efficient performance. It has been explained that the valve is preferably located substantially midway between the opposite ends of the container; and the container is preferably made, for an ordinary size automobile tire, by taking a piece of rubber tube about 16" long, which piece is then rolled back on itself from opposite ends until such ends meet on the exterior of and intermediate the length of a double tube 6½ or 7" long. Such rolled-back ends preferably meet midway of the length of the double tube, and are there joined; and here the air valve is preferably located. And when the resulting sleeve-like container is inflated, the rubber center or core 10 acts, it is believed, as a sort of balance floating between the stretched end walls 7 of the container. The operation of the new container apparently depends less upon the bulging, stretching or expansion of the end wall 7, than upon the rolling, sliding or creeping of the outer sleeve wall 9 relative to the inner sleeve wall 8, and hence a rolling or creeping of the container circumferentially of the shoe.

It will be seen that the new container as above described should, from a practical standpoint, form a desirable, if not essential element of a combination of parts forming a new wheel and tire construction. Such construction is also shown in the drawing; and involves the provision of a collection of parts such that the fact that each container is preferably provided with its own individual air valve, may be taken advantage of to remove an injured container and its valve and substitute another, when a more convenient place than a public roadway is reached, without requiring the shoe to be removed from the rim structure, or the latter to be removed from the felly of the wheel.

To these ends, the felly is built up of a series of arcuate sections 12, permanently connected by spokes 13 with the hub 14 of the wheel, such sections 12 being arranged in alternation all around the wheel with removable sections 15; all as has heretofore been suggested, for instance in U. S. Letters Patent to Kafafian, No. 1,368,252. However, according to the present construction, the rim structure does not have to be taken down, nor has the tire to be removed from such structure, when any particular felly section 15 is to be removed with its associated container and individual valve. This is so, because, as it will be noted from Figs. 1 and 3, the rim structure comprises a pair of identical but oppositely facing rim members 16 having annular grooves 17 for engaging the tire, and bolted directly only to the sections 15 but to all such sections. It will be observed in the present case that two bolts 18 engage the members 16 of the rim structure and each of said sections 12. Thus it will be clear that to remove any particular container 6, it is only necessary to remove the two bolts connected to the rim structure and a section 15 carrying the valve 10 of a deflated container associated with that particular section 15.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A wheel and tire construction including a felly, a rim structure for clinching the base of a standard tire shoe carried by the felly, the felly being formed of a plurality of arcuate sections connected permanently to the wheel hub and a plurality of inwardly radially removable sections arranged around the felly in alternation with said arcuate sections, each of said removable sections carrying an air valve and an inflatable flexible container served individually by said valve, whereby said containers when inflated are arranged end to end all around the interior of the tire shoe, and bolts all engaging said rim structure but a different one engaging each of all said removable sections, whereby on injury to various ones of said containers only the bolts engaging the particular removable sections associated with the last-mentioned containers need be removed to permit removal of the last-mentioned removable sections and their containers; said containers being of rubber and including annular compartments.

2. An inflatable element for the interior of a flexible wheel-tire, including a container of less length than the tire and having walls of elastic material, said container being elongate and having opposite end walls, the container having an interior including an annular compartment between said end walls.

EDWARD H. ACKERMAN.